United States Patent [19]
Li et al.

[11] Patent Number: 5,943,496
[45] Date of Patent: Aug. 24, 1999

[54] METHODS FOR DEVELOPING AND INSTANTIATING OBJECT CLASSES USING A JAVA VIRTUAL MACHINE EXTENSION

[75] Inventors: Shih-Gong Li; Yun-Yong Shen, both of San Jose; Sing-Ban Robert Tien; Tu-Hsin Tsai, both of Saratoga; Ching-Yun Yang, San Jose, all of Calif.

[73] Assignee: Intertop Corporation, Saratoga, Calif.

[21] Appl. No.: 08/858,095

[22] Filed: May 17, 1997

[51] Int. Cl.$^6$ ........................................ G06F 9/40
[52] U.S. Cl. ................. 395/685; 395/709; 395/682
[58] Field of Search .................. 395/701, 702, 395/707, 709, 682, 683, 680, 685, 200.33

[56] References Cited

U.S. PATENT DOCUMENTS

| | | | |
|---|---|---|---|
| 5,129,083 | 7/1992 | Cutler et al. | 707/103 |
| 5,313,636 | 5/1994 | Noble et al. | 707/1 |
| 5,410,702 | 4/1995 | Abraham et al. | 395/683 |
| 5,421,016 | 5/1995 | Conner et al. | 395/685 |
| 5,432,936 | 7/1995 | Gray et al. | 395/705 |
| 5,481,718 | 1/1996 | Ryu et al. | 395/683 |
| 5,493,680 | 2/1996 | Danforth | 395/702 |
| 5,659,751 | 8/1997 | Heninger | 395/685 |
| 5,675,801 | 10/1997 | Lindsey | 395/702 |
| 5,692,195 | 11/1997 | Conner et al. | 395/707 |
| 5,732,263 | 3/1998 | Havens et al. | 395/685 |
| 5,737,605 | 4/1998 | Cunningham et al. | 395/685 |
| 5,778,227 | 7/1998 | Jordan | 395/682 |

OTHER PUBLICATIONS

S.E. Keene, Object–Oriented Programming in Common Lisp, Addison–Wesley Pub. Co., pp. 155–163, May 1989.

T. Ritchey, JavaI, New Riders Publishing, pp. 108–120, 163–187, 334–343, Dec. 1995.

M. Lentczner, "Java's virtual world," Microprocessor Report, vol. 10(4), p8(5), Mar. 1996.

P. Tyma, "Tuning Java performance," Dr. Dobb's Journal, vol. 21(4), p. 52(5), Apr. 1996.

M. Goulde, "Java directions unveiled at JavaOne Developer Conference," Distributed Computing Monitor, vol. 11(7), p. 19(4), Jul. 1996.

J. Jurvis, "A guide to Java tools," InformationWeek, n599, p. 55(5), Sep. 1996.

R. Adhikari, "New Java strains," InformationWeek, n601, p. 61(2), Oct. 1996.

Microsoft PressPass, "Microsoft and Metrowerks Announce Free Redistribution of Virtual Machine for Java and JIT Compiler for the Macintosh," 3 pages, Apr. 1997.

*Primary Examiner*—Robert W. Downs
*Attorney, Agent, or Firm*—Morgan, Lewis Bockius LLP

[57] ABSTRACT

An extension to the JVM is described by which the efficiency with which applications are developed and transmitted between platforms is vastly improved. The present invention imposes a new object model on the Java object model provided intrinsically by the Java programming language. The object model of the present invention separates attribute data from an object which would otherwise be encapsulated therein. This data represents the external interface of a particular instance of the object class. The internal interface of the object class, i.e., the behavior common to all instances of a particular object type, is stored separately in an object type information file.

15 Claims, 9 Drawing Sheets

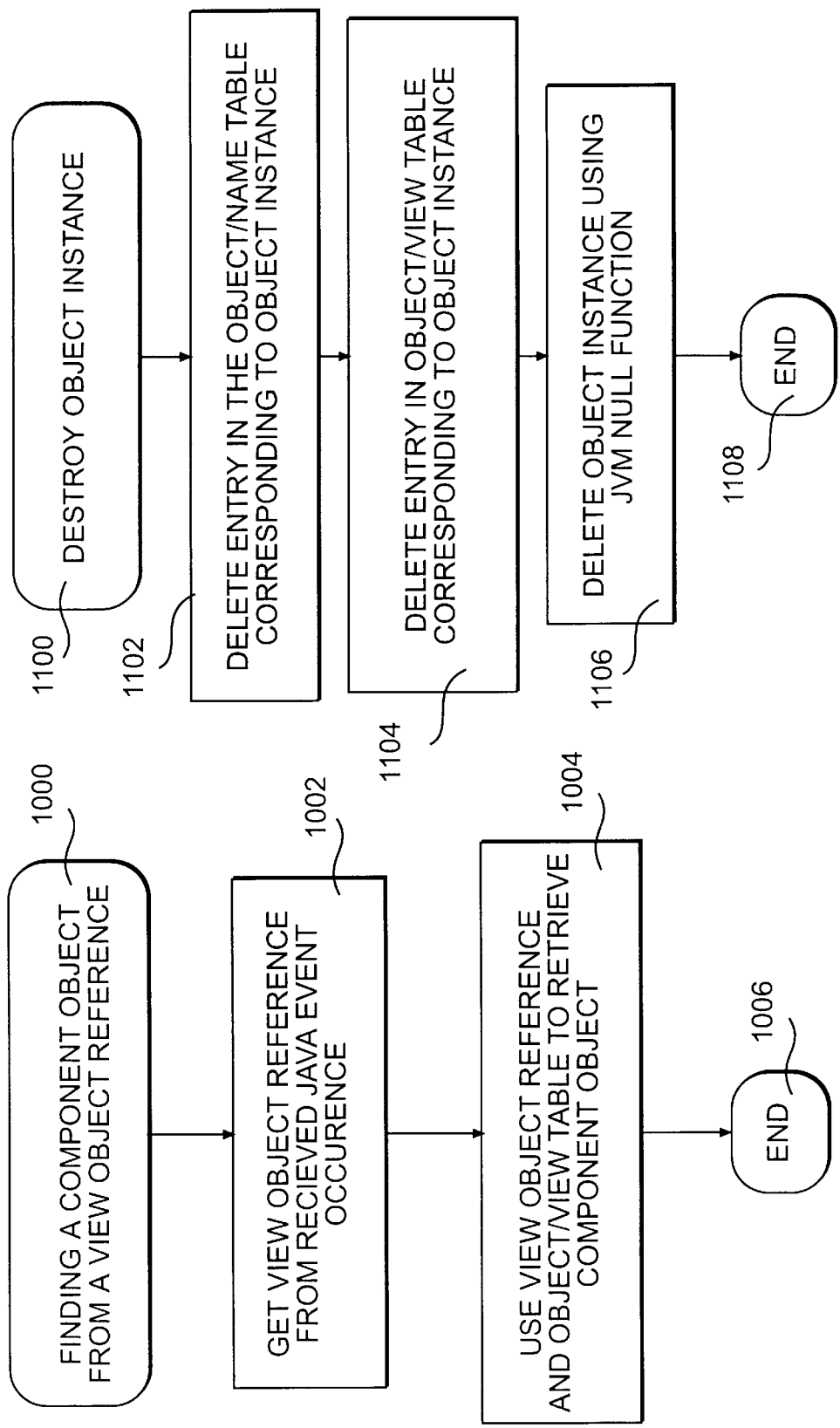

METHODS FOR DEVELOPING AND INSTANTIATING OBJECT CLASSES USING A JAVA VIRTUAL MACHINE EXTENSION

BACKGROUND OF THE INVENTION

The present invention relates to improving the efficiency with which Java applications are transferred between platforms and with which such applications are developed. More specifically, the present invention provides an extension of the JVM, hereinafter referred to as the Inttop virtual machine extension or VMX, which maintains attribute data typically encapsulated in an object separate from the object thereby realizing a number of efficiencies with regard to object instantiation, the transfer of information between server and client platforms, and the development of Java-based applications.

In hypertext markup language (HTML) applications, each time the user of a client machine selects hypertext on, for example, a web page, the server supporting that page transmits or "pushes" an entirely new page over the communication link between the machines, e.g., the Internet, which includes an HTML file and any required image files. With the size of these pages being relatively large and the amount of traffic on the World Wide Web ever increasing, it is not difficult to appreciate the transmission bandwidth limitations associated with this technology. Moreover, given the fact that the main function of HTML is the rendering of objects, its utility with regard to serious Internet applications is limited. Thus, HTML is not a particularly powerful programming tool.

The JVM and the Java programming language represent another technique by which interactive content may be created and transmitted between client and server platforms. Java is, at least potentially, more powerful than HTML with respect to the creation of Internet applications of any real complexity. However, as will be discussed, Java has some significant limitations in this regard.

Initially, when a client platform requests that a particular Java program, i.e., application or applet, be downloaded from a remote server platform, the client receives a Java program file which includes Java subclass definition files for each Java subclass employed by the requested program. If a subclass definition file in the requested program file corresponds to a Java class which is not already available on the client machine, the Java class file must also be downloaded. A subclass definition file defines the internal and external behavior of a particular instance of a Java object class. A Java applet may use several different instances of the Java class "button". A typical web page may include, for example, an "OK" button, a "CANCEL" button and a "HELP" button. Therefore such a page would need to have a subclass definition file for each of these buttons which fully specifies the attributes and behaviors of the associated button. This is the case even though much of the attribute information across the three subclasses is the same. Thus, Java's use of subclassing to create different instances of a particular Java object class represents an inefficient use of data transmission resources.

Moreover, Java represents further inefficiency with respect to the manner in which Java programs are developed. This inefficiency may be understood with reference to the button example discussed above. Each time a Java programmer wants to include a unique instance of the Java class "button" in a Java applet, he must create a new button subclass and write code which specifies each of the attributes and behaviors to be exhibited by the buttons of the new subclass. That is, for example, for each attribute of the new button subclass, the programmer must include a pair of member functions "get data" and "set data". In the case of the "OK", "CANCEL" and "HELP" buttons, much of this code is identical except, of course, for the button labels and the internal behavior triggered by selection of a particular button. As the number of object subclasses in the Java applet increases, the amount of redundant code which must be generated (and transmitted across the internet) correspondingly increases. Thus, not only does Java subclassing create unnecessarily large program files, it also represents a significant inefficiency in the expenditure of programming and application development resources.

Finally, because even the most trivial customization of a Java object class requires the creation of a Java subclass, and thus a fairly advanced knowledge of Java programming, many web page developers do not have the necessary programming experience or skill to build desirable custom features into their Java applications.

It is therefore apparent that there is a need for methods by which Java applications and objects may be transmitted between platforms, and by which applications may be developed which take advantage of information common to different instances of a particular Java object class, thereby preserving network bandwidth and programming resources. This is particularly true if the Java programming language is ever to be used for applications of any substantial size and complexity.

SUMMARY OF THE INVENTION

According to the present invention, an extension to the JVM is described by which the efficiency with which applications are developed and transmitted between platforms is vastly improved. In related copending application Ser. No. 08/857,231, filed May 17, 1997, the entire specification of which is incorporated herein by reference, an application development tool is described which allows application developers to easily customize instances of common Java object classes according to the present invention without subclassing or knowledge of the Java programming language. The virtual machine extension (VMX) of the present invention imposes a new object model on the Java object model provided intrinsically by the Java programming language. On the most basic level, the object model of the present invention separates certain types of data from a Java object which would otherwise be encapsulated in the object. This data represents the external interface or behavior of a particular instance of the Java object class; that is, attributes, event responses, and methods which are specific to the instance. This can be thought of as instance customization information. This data is stored in a block as part of an Inttop application description file which uses the specific instance. In the present invention, the application description file is the counterpart of the Java applet or application.

According to the present invention, the internal interface of the Java object, i.e., the behavior which is common to all instances of the object class, is stored separately as a TYPE INFO file. The TYPE INFO file is somewhat analogous to the Java object class. Inherent in the VMX is a number of these TYPE INFO files which correspond to the most frequently used object types for Internet applications. Each TYPE INFO file acts as a kind of a map for the data blocks in Inttop application description files which correspond to particular instances of the type. The TYPE INFO files also identify the event responses and methods employed by that type which are also stored in the application description file.

According to the present invention, specific objects identified in the application description file are instantiated by essentially combining the information in the TYPE INFO file with the information in the application description file corresponding to the object to be instantiated.

Thus, unlike standard Java programming and object instantiation, a separate subclass need not be created for each object instance which differs from previously created subclasses of the same object type. Rather, the VMX directly instantiates an object class using the TYPE INFO file and the instance-specific data in the application description file.

One of the advantages of this technique is that it eliminates much of the redundant code involved in creating different subclasses of a Java object class. This is because this information is inherent in the TYPE INFO file corresponding to that object type, and the TYPE INFO file is typically inherent in the VMX. Moreover, because much of the data in each object instance employed by an application is separate from and does not need the information in the corresponding TYPE INFO file until the object is actually instantiated, the application files of the present invention are considerably smaller than their standard Java counterparts. This is especially true in the case where there is extensive customization of some standard Java object class.

The application file size advantage of the present invention is particularly significant when considered in the context of the memory available for running such applications in the personal computer environment. Typically, 12 of the 16 Megabytes of available RAM are used by the latest version of the PC operating system. The typical web browser uses much of the remaining 4 Megabytes to run itself and store downloaded files in cache memory. This leaves very little memory for running anything but the most simple Java applications. Thus, if Java is ever to be the basis of substantially complex internet applications, it must dramatically decrease the size of its application components, e.g., object subclass definitions. By avoiding subclassing, the present invention makes this possible.

Another advantage of separating the external interface of an object from its internal interface is realized when different instances of a particular object class are used within the same application or when different applications employ instances of the same object class. Once the corresponding TYPE INFO file is resident in the VMX, any applications which instantiate objects of that type can use that TYPE INFO file to instantiate the objects. By contrast, for Java subclasses not included in the Java development kit, the full Java object subclass definition must be included in each application using that subclass. This is true even where other applications on the same platform use identical object subclasses. This is due to the fact that there is no way of knowing whether a particular subclass definition is already available on the execution platform. Therefore, not only is there data and code redundancy within Java applications across different object subclasses, there is another level of redundancy for the same object subclass across different Java applications.

Yet another advantage is derived from the separation of internal and external object interfaces from the perspective of application development. As discussed above, with Java applications the programmer must completely specify the internal and external behavior of each subclass he creates. This includes all of the code associated with getting and setting each external interface attribute. With the present invention, the application developer need only specify the attribute data values which are then placed in the application description file in a format understood by the generic TYPE INFO file corresponding to the object type. Not only is this much easier from a programming point of view, it also reduces the amount of time required to compile an application developed according to the present invention relative to the compile time for a comparable Java application.

A significant speed advantage is also realized at run time because object instantiation according to the invention does not need to run all of the attribute "set" and "get" commands inherent in the instantiation of a Java subclass. Rather the entire block of external interface data is imported directly from the application description file into the object instance as specified by the TYPE INFO file. Thus object instantiation is dramatically expedited, especially as the number of customized attributes is increased.

Thus, according to the present invention, creating an application requires less programming overhead and skill, and the application, once created, is less taxing on network bandwidth resources. Moreover, applications developed according to the present invention are faster at both compile and run time. A further understanding of the nature and advantages of the present invention may be realized by reference to the remaining portions of the specification and the drawings.

BRIEF DESCRIPTION OF THE DRAWINGS

FIG. 10 is a flowchart illustrating a method for finding an object instance from a view; and FIG. 11 is a flowchart illustrating the destruction of an object instance according to a specific embodiment of the present invention.

DESCRIPTION OF THE PREFERRED EMBODIMENT

Figure 1:
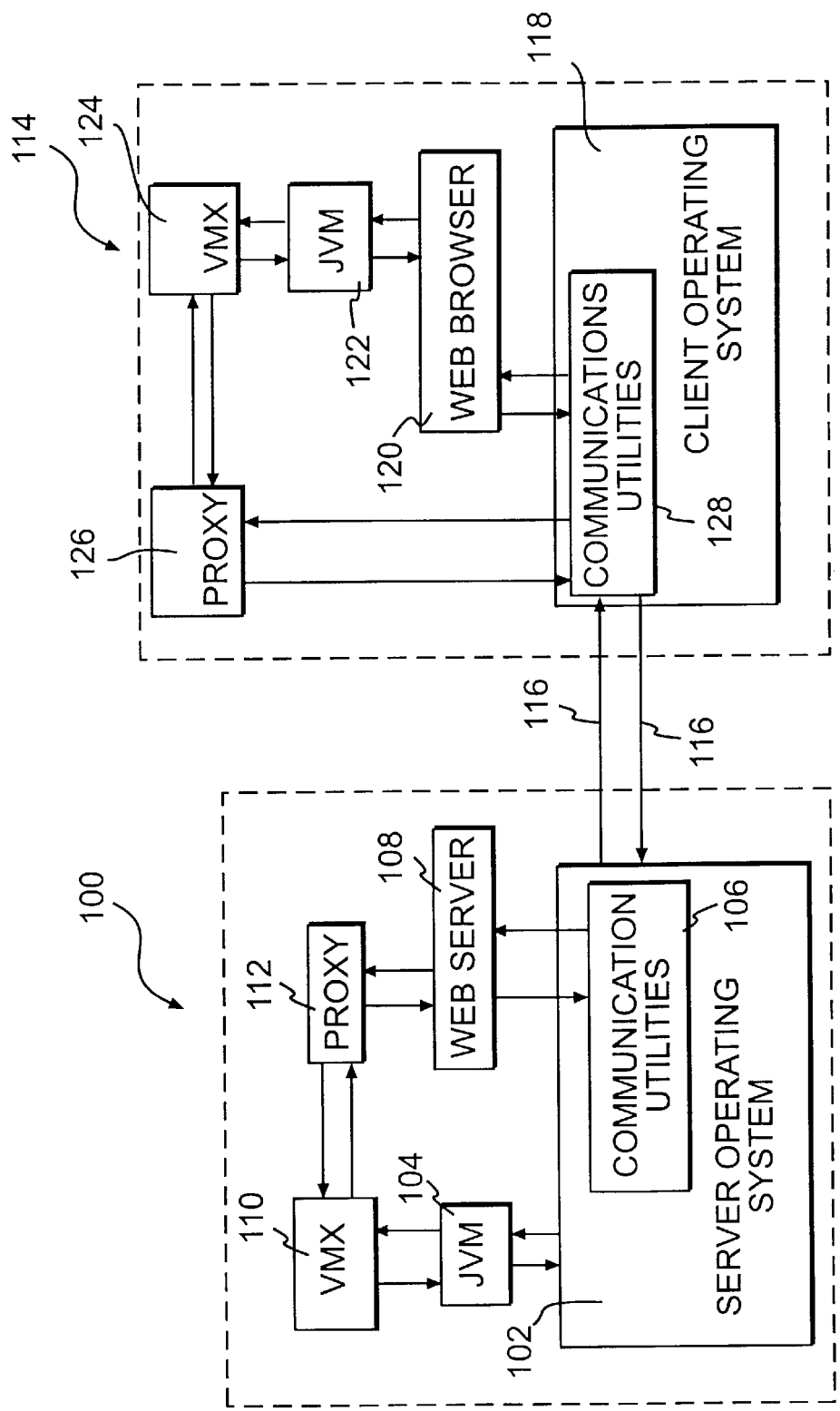
FIG. 1 is a block diagram of a hardware and software environment for use with a specific embodiment of the present invention.

FIG. 1 is a block diagram of a hardware and software environment for use with a specific embodiment of the present invention. A server platform 100 comprises a server operating system (OS) 102 upon which the Java virtual machine (JVM) 104 operates. Communication utilities 106 are controlled by OS 102 and enable communication with the outside world. A web server 108 is also shown operating on top of OS 102 and in two-way communication with communication utilities 106. Virtual machine extension (VMX) 110 operates on top of JVM 104 and may communicate to the world outside platform 100 via the two-way communication path through JVM 104 and OS 102. VMX 110 is also equipped with a communication stub or proxy 112 which enables two-way communication to the outside world either via web server 108, or directly via communication utilities 106.

A client platform 114 is connected to server platform 100 via communications link 116 which, it will be understood, may represent a variety of network architectures having varying levels of complexity. The exact implementation of link 116 is not particularly relevant to the present invention. Client platform 114 comprises a client OS 118 upon which a browser 120 may be operating. It should be noted, however, that the existence of browser 120 is not necessary for the present invention. For example, OS 118 may comprise a set-top box, the operating system of which provides internet browsing functions. On top of browser 120 (or OS 118 if no browser is used), the client-side JVM 122 operates. Client-side VMX 124 operates on top of JVM 122 through which it may communicate with OS 118 and thus the world outside platform 114. As with server-side VMX 110, client-side VMX 124 is similarly equipped with a proxy 126 which enables two-way communication with the outside world via communication utilities 128.

Figure 2A:
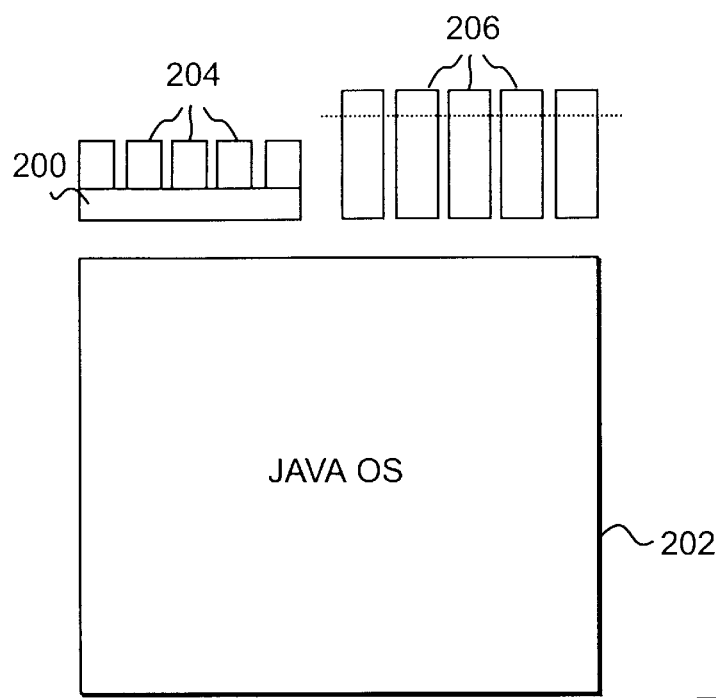
FIG. 2a is a visual comparison of application files of the present invention to standard Java application files.

On some client platforms, the VMX must be downloaded each time the client system begins operating or each time the client platform changes the URL with which it is communicating. For example, if browser 120 is the widely used Netscape browser, the memory cache which holds the VMX is dumped each time the user quits the Netscape browser application or selects a different URL. The cache is dumped when switching URLs due to a security mechanism enforced by the Netscape browser as well as many other browsers. This does not, however, represent a disadvantage with respect to Java because the entire VMX in combination with the first requested application description file is often smaller than a single comparable Java application file. As will be understood, the file size advantage of the present invention grows with each additional requested application file. A comparison of application files is shown visually in FIG. 2a. VMX 200 (about 50 kilobytes) is shown operating on top of Java operating system 202. On top of VMX 200 are five Inttop application files 204, each occupying approximately 60 kilobytes of memory space. On top of Java OS 202 are five comparable Java application files 206, each occupying about 150 kilobytes of memory space. These file sizes are based on typical applications with very simple functions. It is apparent that a file size advantage, i.e., 40 kilobytes, is realized with the downloading of the entire VMX 200 and one Inttop application file 204 versus a single Java application file 206. It is also apparent that the advantage increases with each new application file, i.e., an additional 90 kilobytes for each. For the five files shown, the advantage is 400 kilobytes.

Figure 2B:
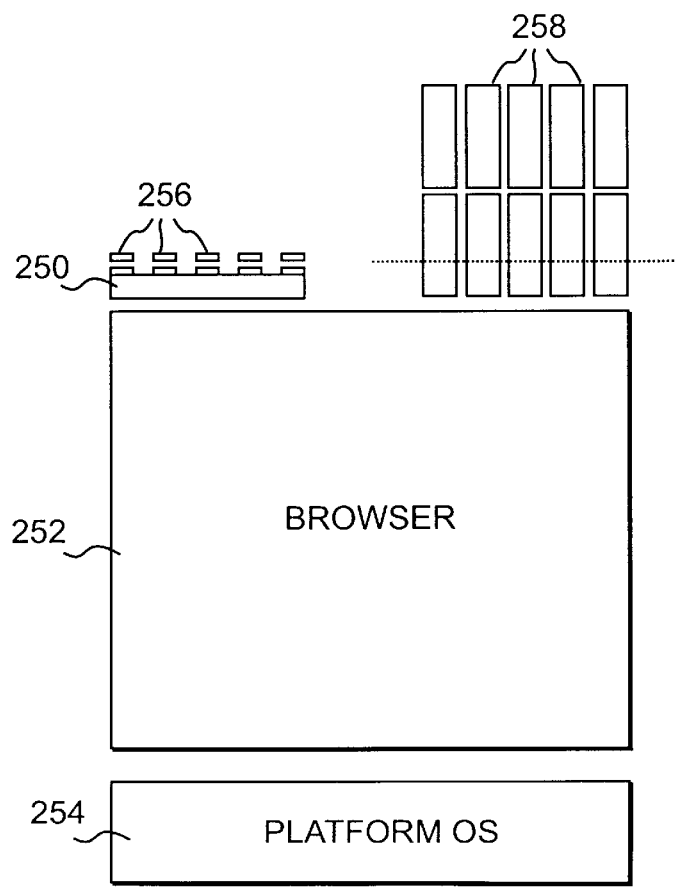
FIG. 2b is a visual comparison of application files of the present invention to HTML files.

At least initially (i.e., for the first few pages downloaded from a remote server), there is less of an advantage versus HTML because HTML files are typically smaller than the VMX. However, given that the vast majority of HTML Internet transactions involve sequentially downloading multiple HTML pages, the file size advantage of the present invention begins to dominate very quickly with each additional page request. In addition, this analysis does not take into account the processing power advantage enjoyed by the present invention over the limited capabilities of HTML. That is, multiple HTML pages along with some server side operations are typically required to provide the functionality of a single Java or Inttop applet. A visual comparison of the file size advantage of the present invention over HTML is shown in FIG. 2b. VMX 250 occupying about 50 kilobytes of memory space is shown operating on top of browser 252 which is operating on top of platform operating system 254. Ten Inttop application files 256, each about 5 kilobytes, are shown on top of VMX 250. Ten comparable HTML files 258, each about 20 kilobytes, are shown on top of browser 252. It is apparent that the file size advantage of the present invention overcomes HTML when the fourth of each type of application file is downloaded (70 vs. 80 kilobytes). As mentioned above, given that, on average, the typical user goes well beyond four pages on a given URL, the file size advantage of the present invention will come into play more often than not. For the ten files shown, the advantage is 100 kilobytes.

The VMX employs generic object types each of which comprises the internal interface behavior common to the objects of that type. Much of the information required for the instantiation of a particular type of object is inherent in the VMX as part of the corresponding TYPE INFO file (approximately 200 bytes) downloaded to the client platform with the VMX. In cases where an application description file calls for instantiation of an object type for which a TYPE INFO file is not already included in the VMX, the corresponding TYPE INFO file must be downloaded into the VMX. This may be done when the application description file is transmitted to the requesting platform (as an appended file). It may also be done when the VMX attempts to instantiate the object type and realizes it doesn't have the appropriate TYPE INFO file. At that point, the VMX requests the new TYPE INFO file from the server which transmitted the application description file.

Figure 3:
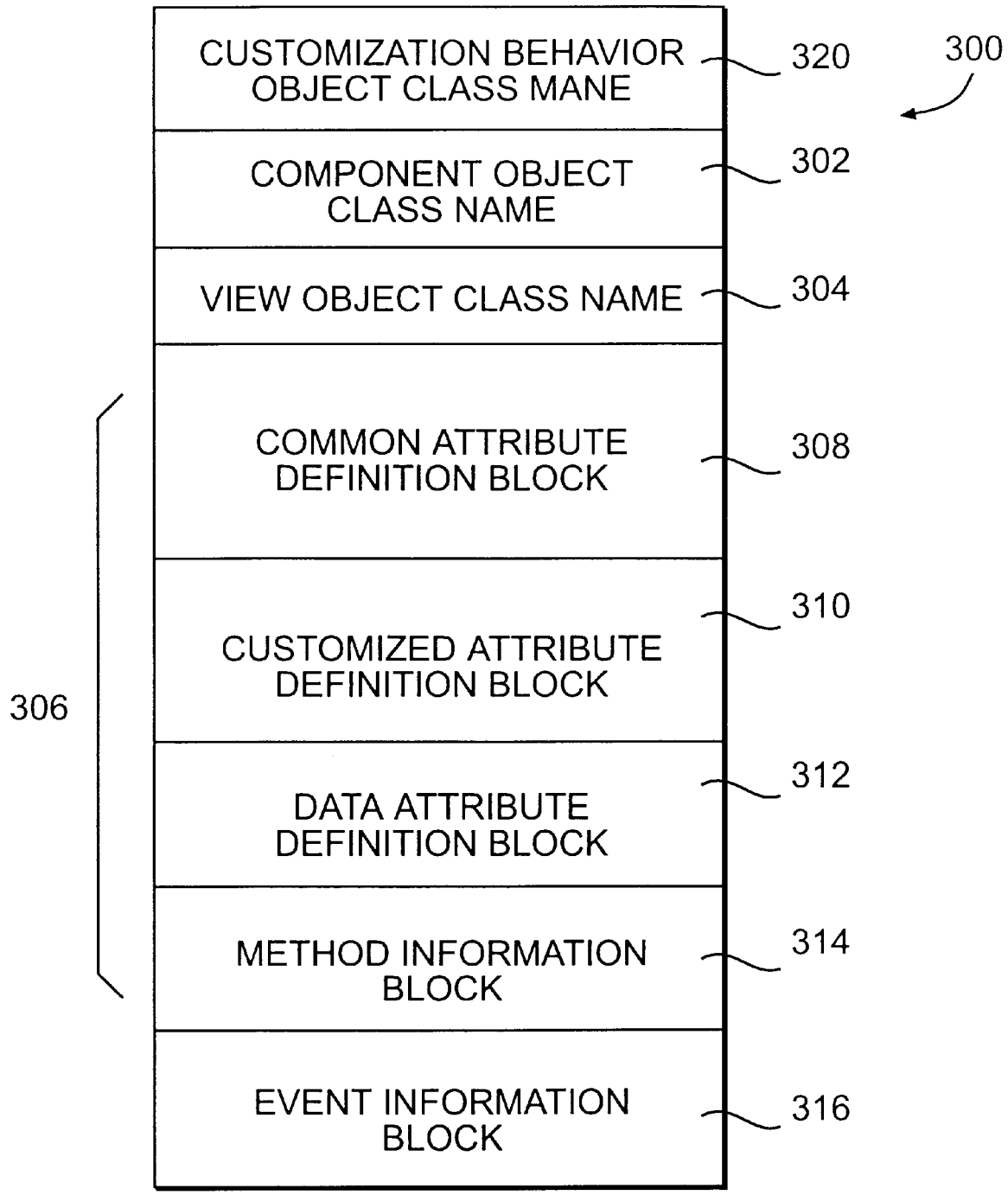
FIG. 3 is a diagram of a TYPE INFO file associated with a particular object class according to a specific embodiment of the present invention.

As discussed above, depending upon the configuration of the requesting platform, the entire VMX may need to be downloaded each time the client platform begins operation. This would then also be true for any new TYPE INFO files downloaded during a previous session. That is, the new TYPE INFO file would need to be downloaded at least once each session the first time an application using that object type is requested. This is true, for example, in the Netscape environment which, as mentioned above, enforces a security mechanism which necessitates reloading the VMX at the beginning of operation as well as each time the user switches to a new URL. If, however, the platform allows for caching of such files (e.g., a set-top box operating system) the new TYPE INFO file can become resident on that platform for future use by other applications. The structure of a typical TYPE INFO file 300 is shown in FIG. 3.

At the beginning of the file is a component object class field 302 which specifies the name of the requested Java component object class. If there is a view associated with the component class, the Java view object class name is specified in field 304. Thus, the VMX employs traditional Java component and view object classes. Attribute information block 306 contains three subcategories of attribute definition information. In common attribute definition block 308, default values for attributes common across all object types are stored. In customized attribute definition block 310, default values for attributes specific to the requested instance are stored. Finally, data attribute definition block 312 contains the default values for a specific category of customized attributes, i.e., those that are considered as data to be processed in the conventional data processing tasks. Separation of this type of customized attribute from the other customized attributes defined in block 310 allows for more efficient data collection. For a more detailed discussion of the structure of attribute information block 306, please refer to commonly assigned, copending U.S. patent application Ser. No. 08/857,231, filed May 17, 1997, the entire specification of which is incorporated herein by reference.

After data attribute information block 306, method information block 314 includes information about the various methods associated with the object type including the method names and signatures (i.e., arguments). Event information block 316 includes the names and signatures of event responses employed by the object type to events such as, for example, a mouse click or movement. These basic fields and data blocks, are part of every TYPE INFO file. However, if a Java programmer wishes to create a new object type with more sophisticated behavior than one of the standard TYPE INFO files, he may insert additional Java object class fields for each new behavior desired. These might include, for example, a customization behavior object class name field 320 which refers to Java object classes exhibiting the additional behavior desired for the new object type. The capability of incorporating such additional object class behavior to create a new Inttop object type will typically not be available to the application programmer. New object types exhibiting such behavior will most likely be provided by Inttop or its third party vendors.

Figure 4:
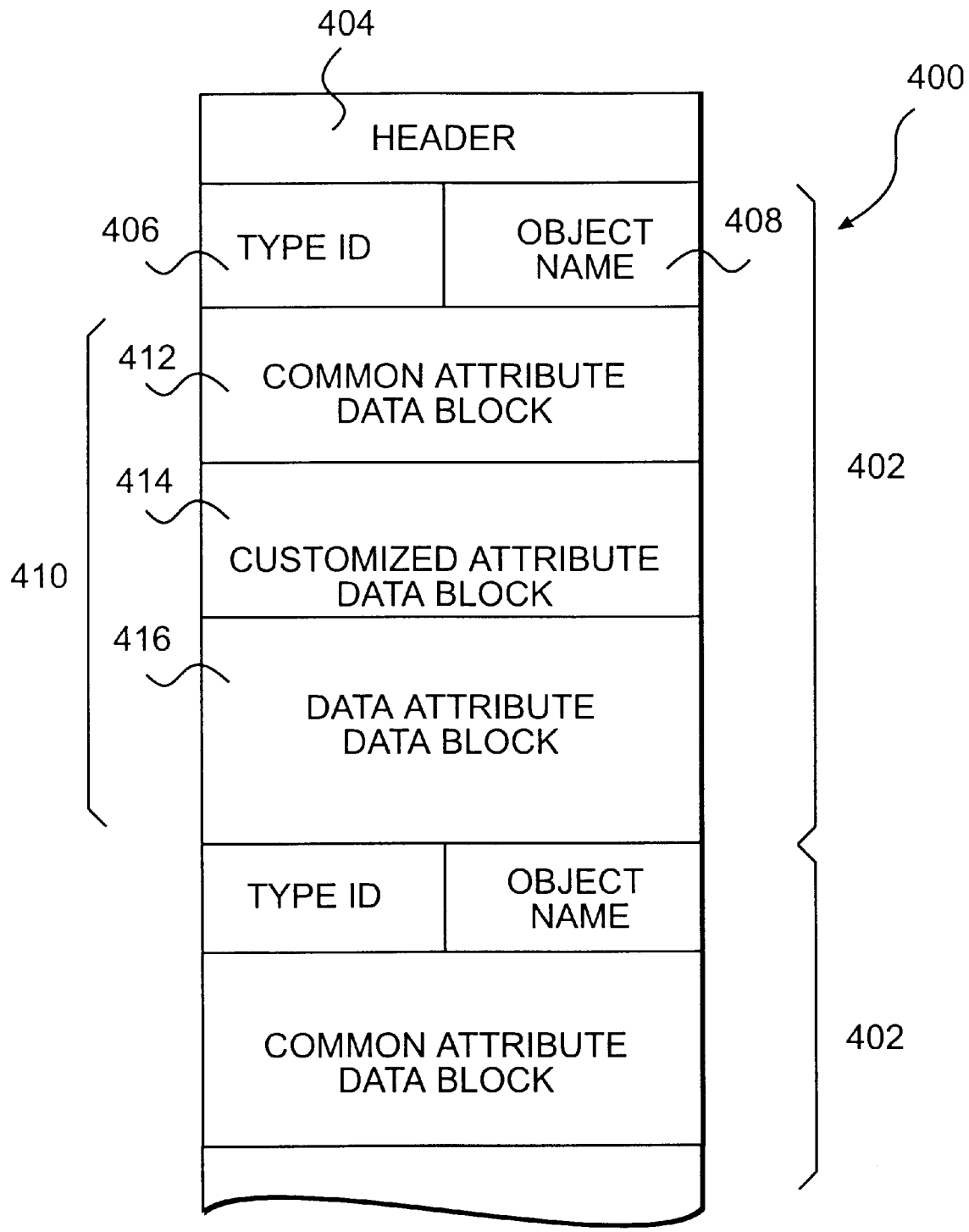
FIG. 4 is a diagram of a project description file according to a specific embodiment of the present invention.

The actual attribute data corresponding to attribute information block 306 for each instance of a particular object type and the methods called out in method information block 314 are contained in an application description file which employs one or more instances of the object type. An application description file corresponds to the Inttop application or applet. The structure of an application description file 400 is shown in FIG. 4. A portion 402 of application description file 400 is occupied by attribute data for each of the component object instances employed by the application. The application is identified by a header 404 which contains the application name, a universally unique application ID, the size of the application description file, the application version number, and a check byte field which indicates whether the application description file has been correctly created and installed. Each portion 402 includes a TYPE ID field 406 for identifying the object type, and an object name field 408 for identifying the particular object instance. Following these fields within each portion 402 is attribute data block 410 which includes common attribute data block 412, customized attribute data block 414, and data attribute data block 416. These three data blocks contain the actual attribute data required to instantiate the component object class corresponding to the particular portion 402 and are in the format defined in the associated TYPE INFO file corresponding to the component type.

According to a specific embodiment of the invention, when an application is being built, the method and event script code for each Inttop object type are stored in an event-method definition class file corresponding to that application. The Inttop development environment is described in the related copending application referred to above. According to a specific embodiment of the invention, the application developer has the option of appending this class file at the end of application description file 400. Alternatively, the event-method class definition file may be maintained separately from application description file 400 on the same server.

Typically, the application description files (and any associated event-method class definition files) are stored in a repository on the server platform. When the client platform requests a particular Inttop application or applet, the server transmits the corresponding application description file. The size of a typical application description file is relatively small (e.g., 60 kilobytes) when compared to a similar Java application employing comparable Java subclasses (e.g., 150 kilobytes). The objects employed by the application are then instantiated on the client platform using the attribute data from the application description file and the type information in the TYPE INFO file (which is typically inherent in the VMX).

When a client platform requests that a particular Inttop application resident on the server platform be downloaded to the client side, the server determines whether the VMX has been downloaded to the client platform. If not, the VMX, which includes a number of TYPE INFO files, (altogether approximately 50 kilobytes) is transmitted to the client along with the requested application description file.

Figure 5:
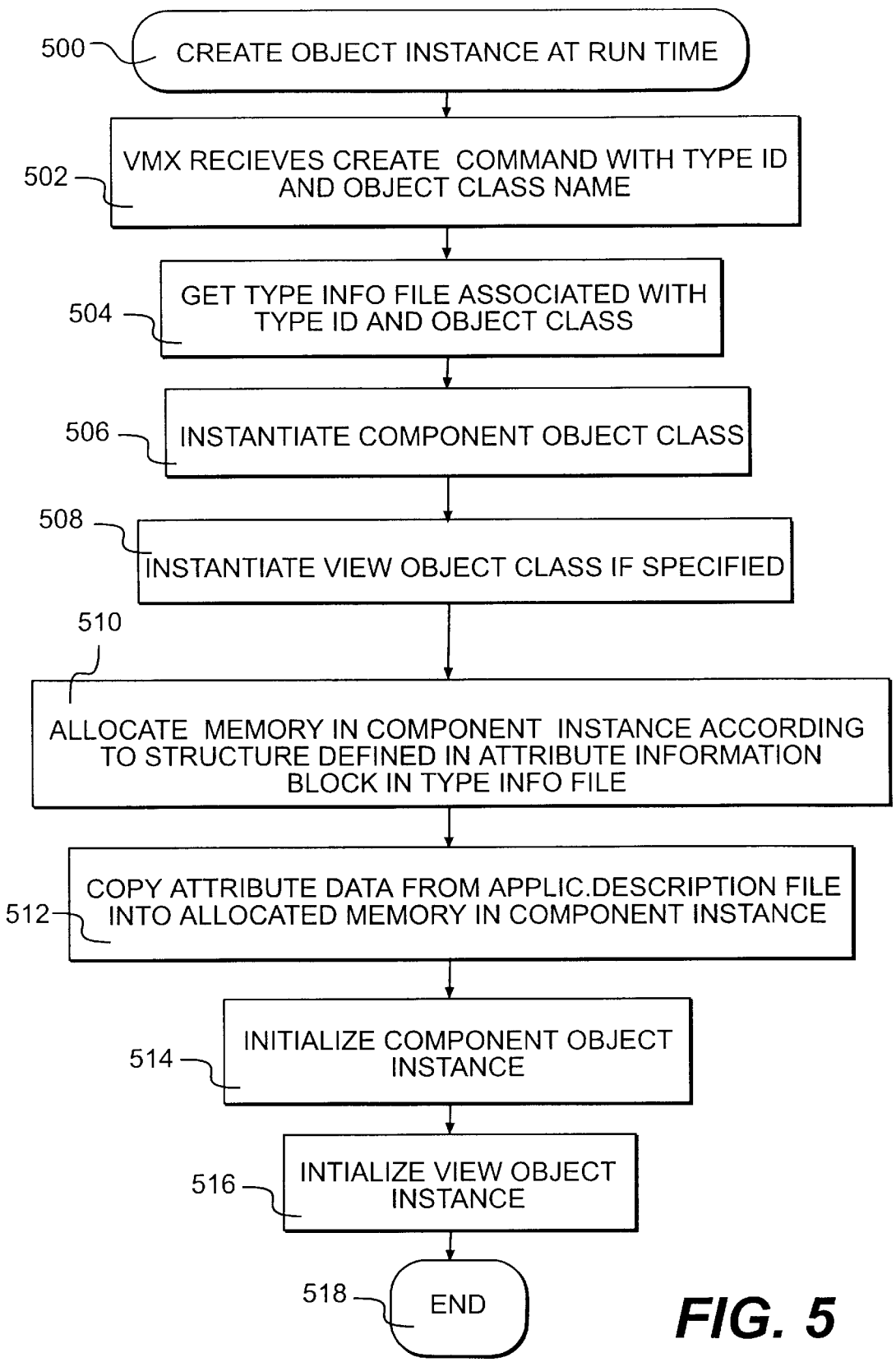
FIG. 5 is a flowchart illustrating the creation of an object instance at run time.

Referring now to FIG. 5, the method by which an object instance is created at run time will be described according to a specific embodiment of the invention. The description will be set forth without regard to where the method steps are being performed (i.e., server vs. client) as this is irrelevant to the invention. It will be understood that, according to a variety of scenarios, the creation of an object instance may occur exclusively in the server or the client platforms, or via communications between the two in either direction.

Initially, the VMX receives a create command which specifies the type ID and the object class name of an object class to be instantiated (step 502). The VMX retrieves the TYPE INFO file corresponding to the argument of the create command by referring to a hash table which relates TYPE INFO files to the various combinations of type ID and object class name (step 504). The VMX then instantiates the component object class specified in the TYPE INFO file (step 506). If a view object class is specified by the TYPE INFO file, it also is instantiated (step 508). These instantiations may be performed according to standard Java instantiation protocols.

Memory is then allocated in the component instance according to the structure defined in the three attribute definition blocks (i.e., blocks 308, 310 and 312 of FIG. 3) in the TYPE INFO file (step 510). The actual data from the attribute data blocks (i.e., blocks 412, 414 and 416 of FIG. 4) in the project description file is then copied to the memory allocated in step 510 (step 512). The VMX then initializes the component object instance created in step 506 (step 514). The VMX also initializes the view object instance if one was created (step 516). The initialization of component and view object instances is described below with reference to FIG. 7.

Figure 6:
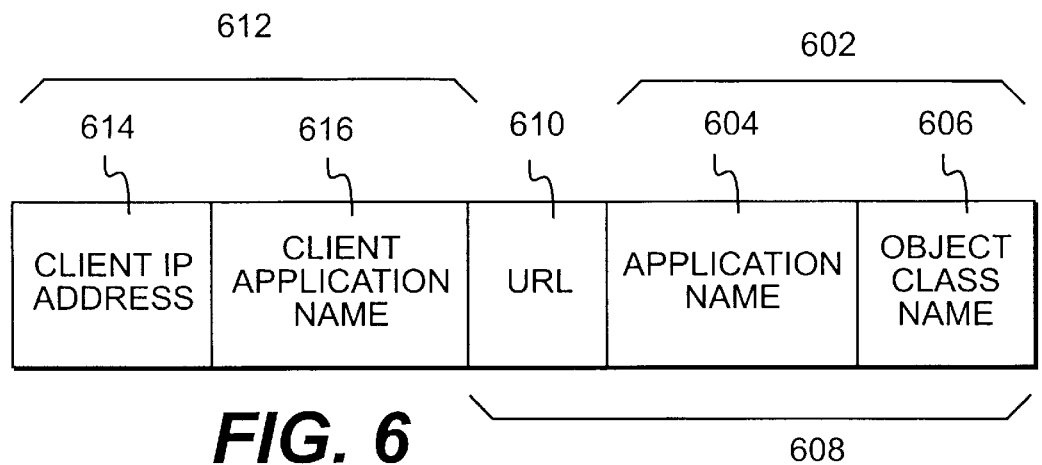
FIG. 6 is diagram of an object instance specification format according to a specific embodiment of the present invention.

When the VMX instantiates an object class, it specifies a name for the instance which is recognizable outside of the application in which the object instance is created. FIG. 6 shows the format of an object instance specification 600 according to a specific embodiment of the invention. Object instance specification 600 is employed by a scripting language supported and managed by the VMX to globally identify object instances and allow different applications to use the same object instance. The scripting language uses only the portion of the specification required to complete the communication. Thus, if the communication is between two applications on the same platform, only local reference 602 comprising application name 604 and object class name 606 is required. If the communication is between applications on different platforms, global reference 608 (including URL 610) is required. Finally, if the communication is from a client platform to a server platform, a heading 612 including client IP address 614 and client application name 616 is required. This is due to the fact that client names are often dynamically assigned and the server would not otherwise know the origin of the communication.

By contrast, the JVM does not create a generalizable object instance specification. Rather, to enable Java applications to communicate with each other, Java programmers make use of static global variables, a strategy which is considered dangerous in the programming world because of the potential for such variables to be corrupted. Thus, Java applications cannot directly or reliably communicate with each other with the ease facilitated by the present invention. The significance and utility of the communication capability of the present invention will become apparent with reference to the various functionalities of the VMX described below.

Figure 7:
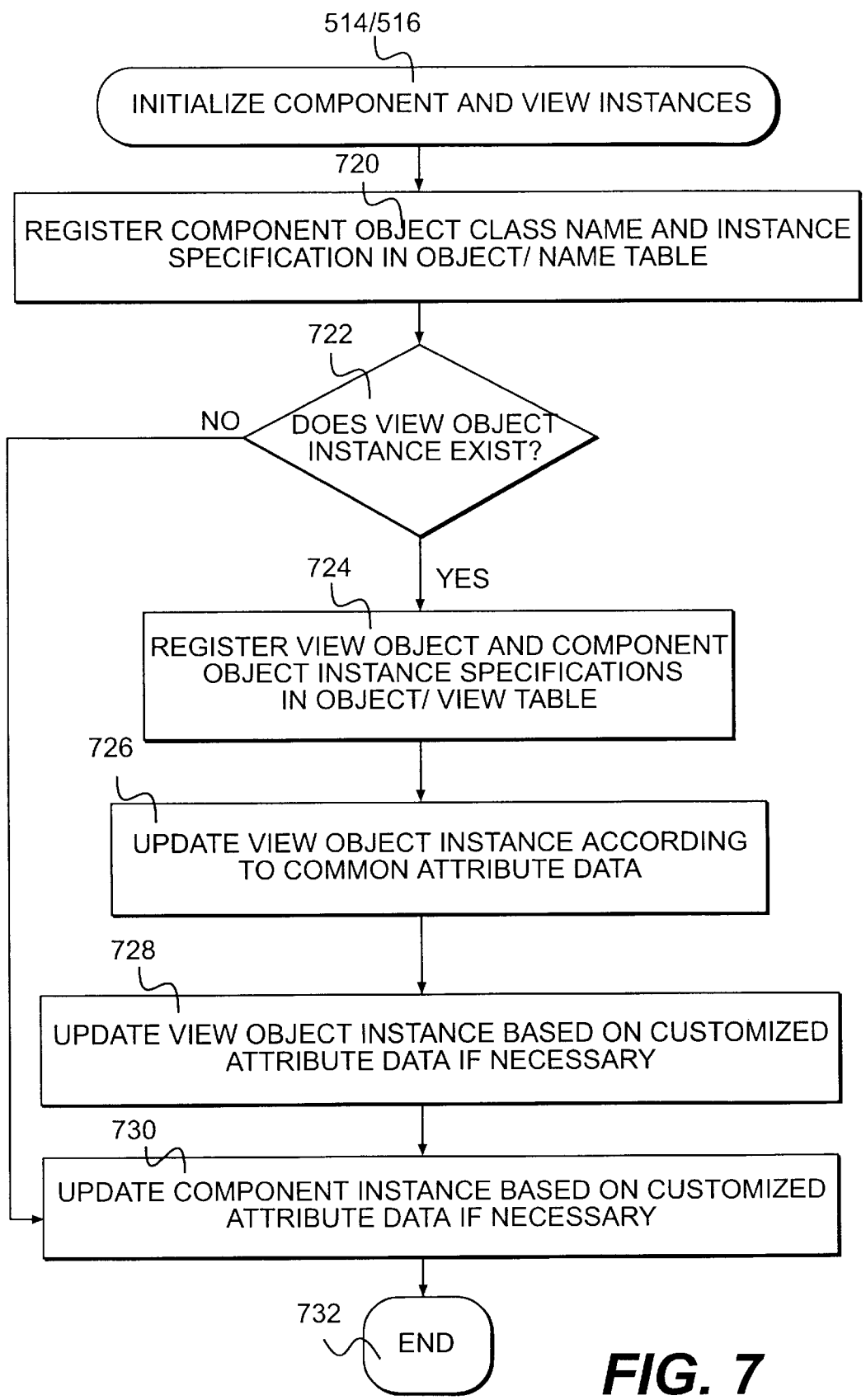
FIG. 7 is a flowchart illustrating the initialization of created component and view objects according to a specific embodiment of the present invention.

Referring back to steps 514 and 516 of FIG. 5, the initialization of created component and view object instances will now be described with reference to FIG. 7. The VMX first registers the component object class name and the component object instance specification in a hash table referred to herein as the object/name table (step 720). The object/name table is for enabling the VMX to identify the component object instance associated with a particular instance name. Enabling the VMX to find an object instance based on its name allows communication between applications as will be discussed in greater detail below. If a view object instance has been created (step 722), both the view object instance reference and the component object instance specification are registered in another hash table referred to herein as the object/view table (step 724). The object/view table is for enabling the VMX to identify the component object instance corresponding to a particular view, and to thereby allow passage of a view message to the appropriate component instance for further processing. The view object instance is then updated according to the common attribute data from the corresponding project description file (step 726). The view object instance is also updated according to the customized attribute data if necessary (step 728). Finally, the component object instance is updated according to its customized attribute data is necessary (step 730). If no view object instance is found in step 722, the algorithm goes directly to step 730.

Figure 8:
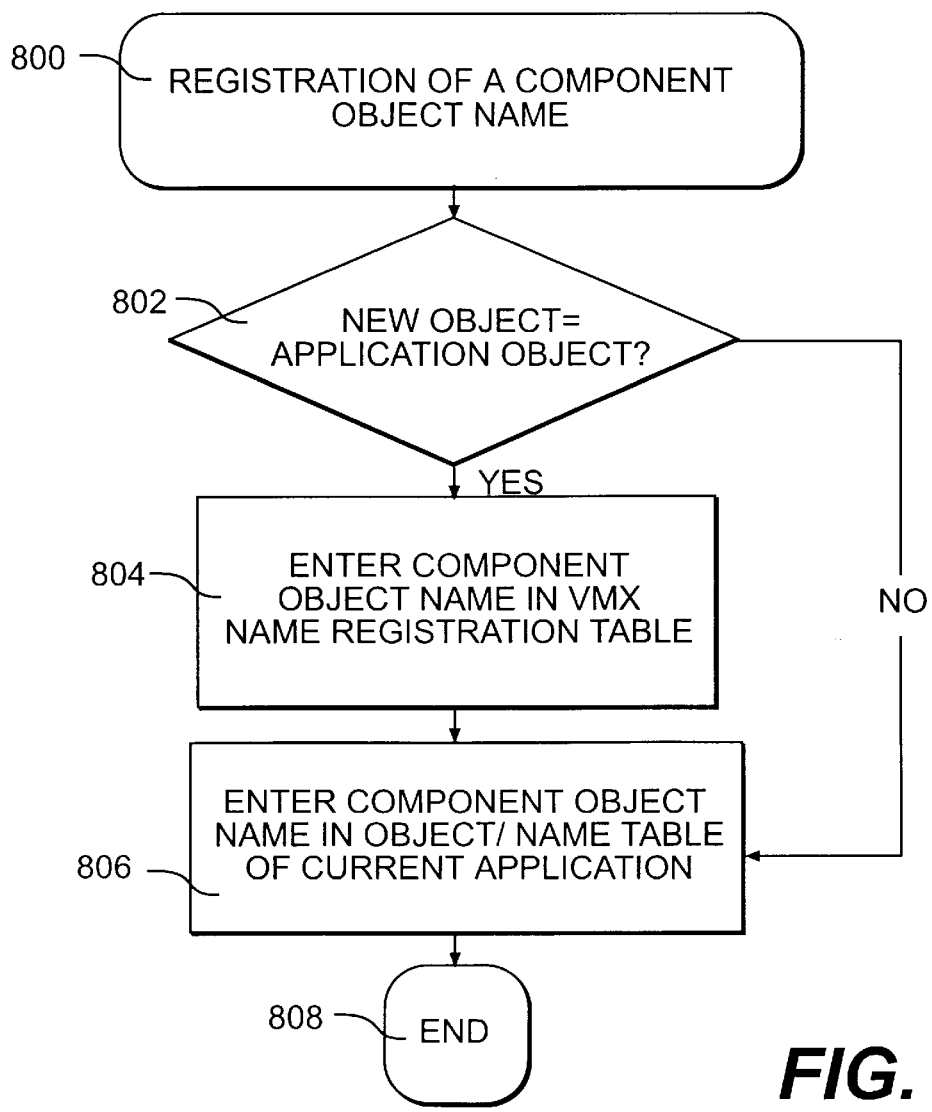
FIG. 8 is a flowchart illustrating the registration of an object name.

Referring back to step 720 of FIG. 7, the registration of a component object name will be described in more detail with reference to FIG. 8. If the newly created component object instance is an application object (step 802), the component object name is entered in the a name registration table of the VMX which lists the applications currently resident on the VMX (step 804). The component object name is then entered into the object/name table corresponding to the application (step 806). If the component object instance is not an application object, the component object name is only entered into the object name table corresponding to the application to which the object belongs.

Figure 9:
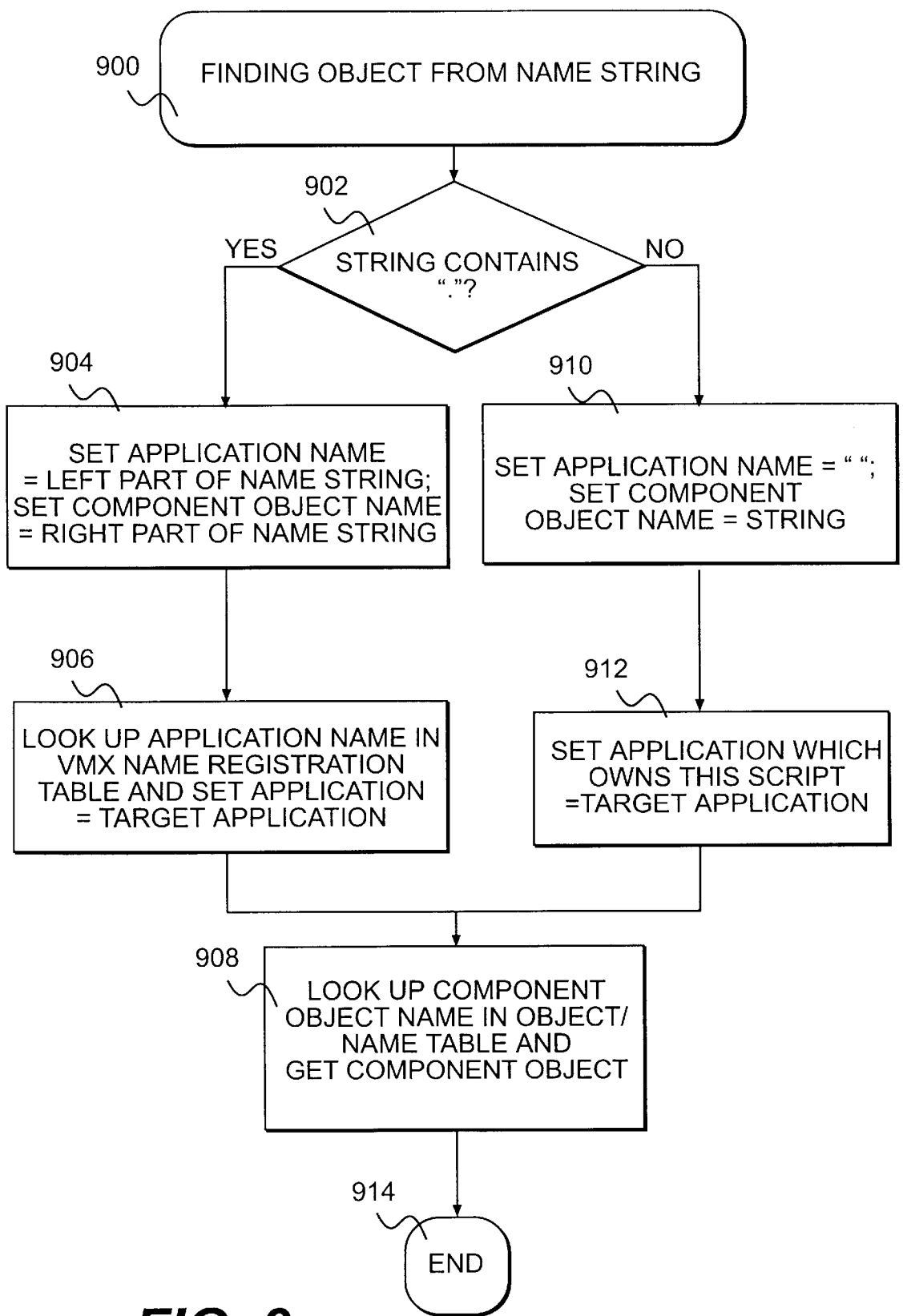
FIG. 9 is a flowchart illustrating a method of finding an object instance referenced by the scripting language of the present invention.

FIG. 9 illustrates a method by which an object instance referenced in the VMX scripting language is found. When the VMX encounters a name string referring to an object instance while executing script code associated with, for example, a particular application file, it is first determined whether the string contains the delimiter ".", i.e., whether the reference is a two part reference (step 902). If the string is found to be a two part reference, the left-hand portion of the string is designated as the application name and the right-hand portion of the string is designated as the component object name (step 904). So, for example, if the string is "APP2.COMP3", the application name is set to "APP2" and the component object name is set to "COMP3". The application name is then used as a key to find the application in the VMX name registration table and to set that application as the target application (step 906). The component object name is then used to find the referenced component object in the object/name table of the application (step 908). If the name string is not a two part name, the whole string is designated as the component object name and the application name is set as empty (step 910). Thus, for example, if the string is "COMP2", the application name is set to "", and the component object name is set to "COMP2". The target application is then set as the application which owns the script which includes the name string (step 912). The object name is then used to find the component object in the target application's object/name table (step 906).

FIG. 10 illustrates the manner in which a component object instance is found from a view object reference which corresponds to a Java event occurrence such as, for example, a mouse click on a button view. Initially, the view object reference is obtained from the received event (step 1002). The view object reference is then used to refer to the appropriate object/view table to retrieve the component object corresponding to the referenced view (step 1004).

The destruction of an object instance will be discussed with reference to FIG. 11. When the purpose for which an object has been instantiated has been fulfilled, the object instance is destroyed to conserve memory resources. This is analogous to Java garbage collection. Initially, the entry in the object/name table corresponding to the object instance is deleted (step 1102). The corresponding entry in the object/view table is also deleted (step 1104). Finally, the object instance itself is deleted using the JVM null function (step 1106).

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A method for specifying an object instance corresponding to an object class comprising the steps of:

generating an object type information file which specifies an internal interface for the object instance, the object type information file also containing definition data which map attribute data to memory allocated in the object instance according to the definition data, the attribute data specifying an external interface for the object instance; and generating the attribute data in an application file separate from the object type information file;

wherein the object type information file and the attribute data in the application file are employed together to create the object instance during execution of the application file.

2. A method for instantiating an object class comprising the steps of:

generating an object instance corresponding to the object class;

allocating memory in the object instance for attribute data according to definition data in an object type information file, the definition data mapping the attribute data to the allocated memory, the object type information file specifying an internal interface for the object instance; and writing the attribute data from an application file into the memory allocated in the object instance during execution of the application file, the attribute data specifying an external interface for the object instance, the application file being separate from the object type information file.

3. The method of claim 2 further comprising the step of generating an object instance specification for identifying the object instance outside of the application file.

4. The method of claim 3 further comprising the step of entering the object instance specification in a first table corresponding to the application file, the first table indicating a location for the object instance in the application file.

5. The method of claim 4 wherein when the purpose for which the object instance was created has been accomplished the method further comprises the steps of:
   deleting the object instance specification from the first table; and
   deleting the object instance using a Java virtual machine null function.

6. The method of claim 4 wherein the object instance comprises a component object instance and the object instance specification comprises a component object instance specification, the method further comprising the steps of:
   generating a view object instance corresponding to the component object instance;
   generating a view object instance specification for identifying the view object instance outside of the application file; and
   entering the view object instance specification and the component object instance specification in a second table corresponding to the application file, the second table correlating the component object and view object instance specifications.

7. The method of claim 6 wherein when the purpose for which the object instance was created has been accomplished the method further comprises the steps of:
   deleting the component object instance specification from the first table;
   deleting the view object instance specification and the component object instance specification from the second table; and
   deleting the object instance using a Java virtual machine null function.

8. The method of claim 4 wherein the object instance comprises an application object instance, the method further comprising the step of entering the object instance specification in a second table corresponding to a local platform, the second table identifying application objects currently resident on the local platform.

9. The method of claim 2 wherein the step of generating an object instance comprises executing script code corresponding to the object class, the script code being stored in the application file.

10. The method of claim 2 wherein the step of generating an object instance comprises executing script code corresponding to the object class, the script code being stored in a script code file separate from and associated with the application file.

11. A method for finding an object instance from an object reference in script code in a first application file, the method comprising the steps of:
   determining whether the object reference identifies a second application file in addition to an object instance specification;
   where the object reference does not identify the second application file, looking up the object instance specification in a first table corresponding to the first application file, the first table indicating a first location for the object instance in the first application file;
   where the object reference identifies the second application file, looking up the object instance specification in a second table corresponding to the second application file, the second table indicating a second location for the object instance in the second application file; and
   retrieving the object instance from one of the first and second locations.

12. A method for finding a component object instance from a view object reference comprising the steps of:
   receiving the view object reference in response to an occurrence of an event;
   referring to a first table to determine a component object reference, the first table correlating the component object reference and the view object reference; and
   retrieving the component object instance using the component object reference.

13. An extension of a Java virtual machine comprising:
   an object type information file specifying an internal interface for an object instance, the object instance corresponding to an object class, the object type information file comprising definition data according to which memory is allocated in the object instance for attribute data, the definition data mapping the attribute data to the allocated memory, the attribute data being stored in an application file separate from the object type information file and specifying an external interface for the object instance; and
   means for instantiating the object instance, the instantiating means being operable to allocate the memory in the object instance and write the attribute data from the application file into the memory during execution of the application file.

14. At least one computer readable medium containing program instructions for specifying an object instance corresponding to an object class, said at least one computer readable medium comprising:
   computer readable code for generating an object type information file which specifies an internal interface for the object instance, the object type information file also containing definition data which map attribute data to memory allocated in the object instance according to the definition data, the attribute data specifying an external interface for the object instance; and
   computer readable code for generating the attribute data in an application file separate from the object type information file;
   wherein the object type information file and the attribute data in the application file are employed together to create the object instance during execution of the application file.

15. At least one computer readable medium containing program instructions for instantiating an object class, said at least one computer readable medium comprising:
   computer readable code for generating an object instance corresponding to the object class;
   computer readable code for allocating memory in the object instance for attribute data according to definition data in an object type information file, the definition data mapping the attribute data to the allocated memory, the object type information file specifying an internal interface for the object instance; and computer readable code for writing the attribute data from an application file into the memory allocated in the object instance during execution of the application file, the attribute data specifying an external interface for the object instance, the application file being separate from the object type information file.

* * * * *